United States Patent Office 3,141,120
Patented July 14, 1964

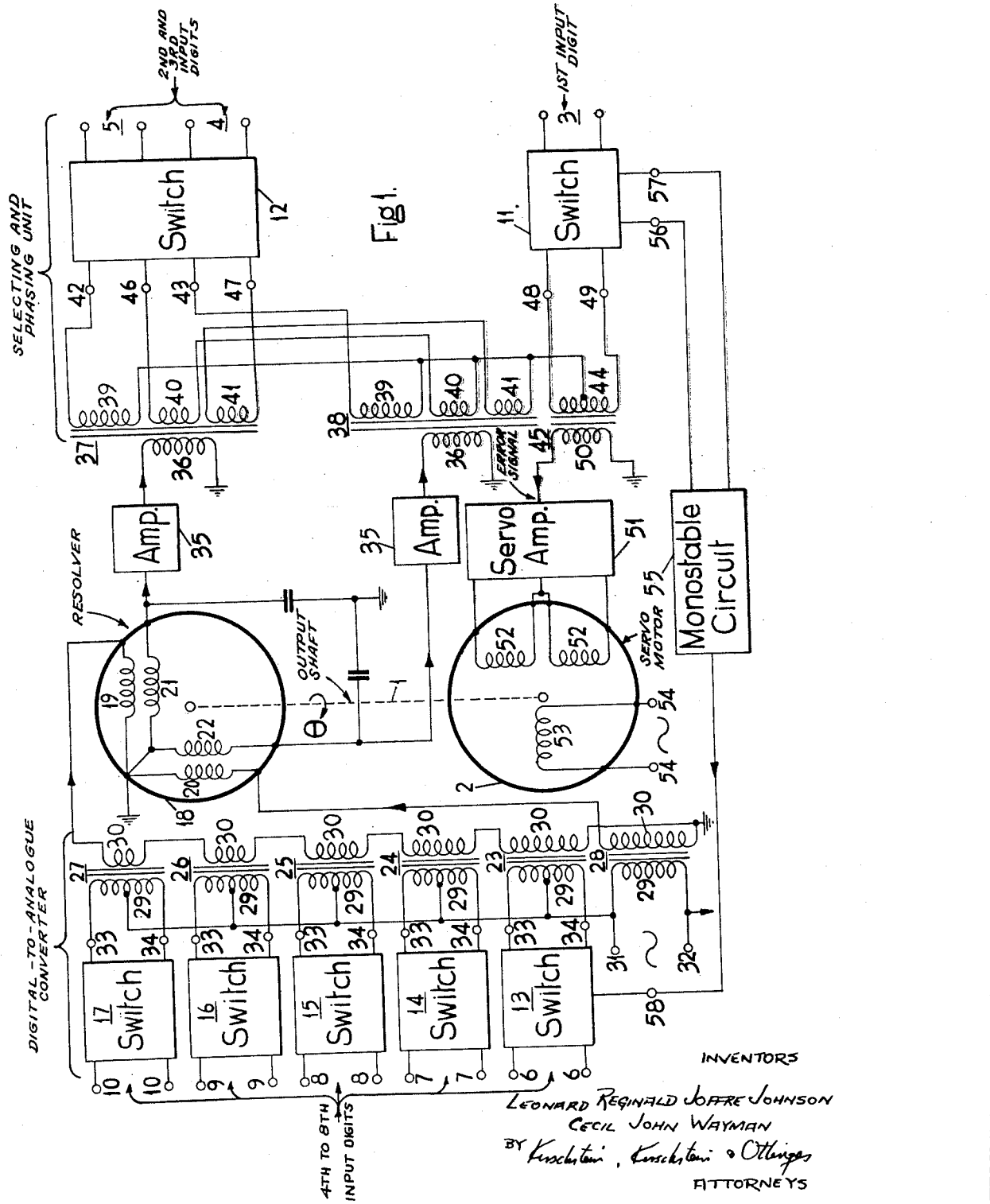

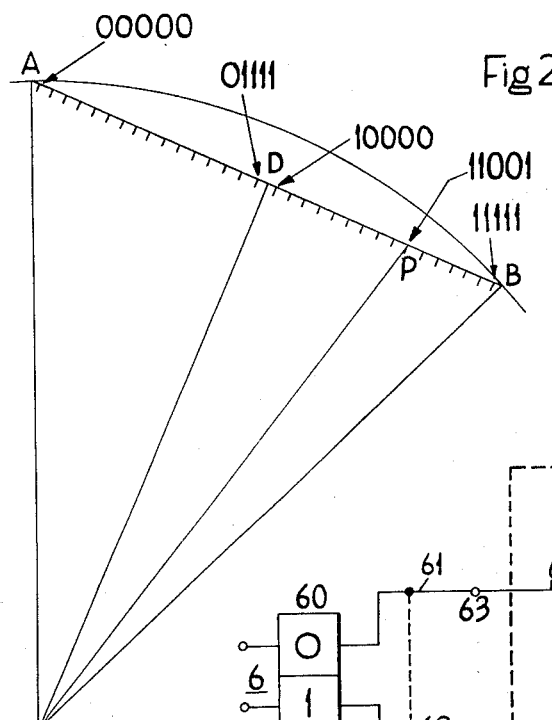
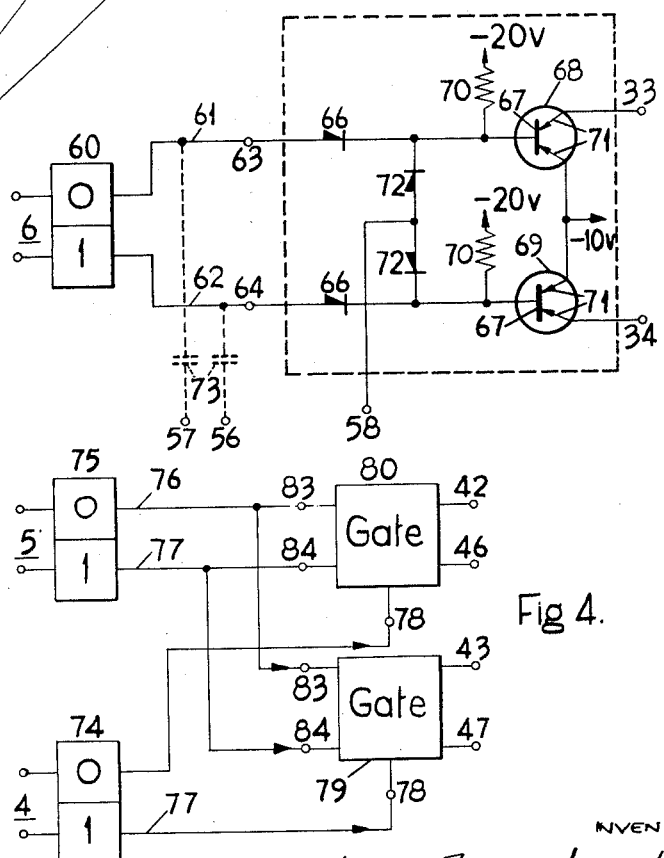

3,141,120
ELECTRICAL APPARATUS FOR ANGULARLY PO-
SITIONING A SHAFT IN DEPENDENCE UPON
INPUT DIGITAL SIGNALS
Leonard Reginald Joffre Johnson and Cecil John Way-
man, Stanmore, England, assignors to The General
Electric Company Limited, London, England
Filed June 9, 1961, Ser. No. 116,147
Claims priority, application Great Britain June 10, 1960
11 Claims. (Cl. 318—18)

This invention relates to electrical apparatus for angularly positioning a shaft in dependence upon input digital signals.

According to the present invention electrical apparatus for angularly positioning a shaft in dependence upon input digital signals, comprises an electric motor for rotating the shaft, first means that is coupled to the shaft and that is arranged to supply an electric signal the amplitude of which varies in accordance with variation in angular position of the shaft, and second means that is arranged to derive from the signal that is supplied by said first means an electric signal for controlling rotation of the shaft by the motor, the arrangement being such that the amplitude of the controlling signal is dependent on the one hand upon the angular position of the shaft and on the other hand upon the digital values of the input signals, and that the motor rotates the shaft so as to tend to reduce the amplitude of the controlling signal to zero and thereby angularly position the shaft in accordance with the digital values.

The apparatus may include an electric resolver that has a rotor that is coupled to the shaft to rotate therewith, and means for applying to the resolver two signals that are together representative of a shaft position vector as demanded by the digital values of a first group of said input signals, the arrangement being such that the resolver supplies two electric signals the amplitudes of which are representative of the components along respective axes defined in the rotor of said vector, and that the controlling signal is derived selectively from one or both of the signals supplied by the resolver in dependence upon the digital values of a second group of said input signals.

According to a feature of the present invention electrical apparatus for angularly positioning a shaft in dependence upon input digital signals, comprises an electric motor for rotating the shaft, an electric resolver having a rotor and a stator that carry two pairs of windings respectively, the rotor being coupled to the shaft so as to rotate therewith relative to the stator, a plurality of first switch means that are arranged to be set in dependence upon the values of lesser-significant digits represented by the input digital signals, means for applying alternating current excitation signals to a first of the two pairs of resolver windings, it being arranged that the amplitude of the excitation signal that is applied to one of the two windings of the first pair is dependent upon the settings of said first switch means, a plurality of second switch means that are arranged to be set in dependence upon the values of more-significant digits represented by the input digital signals, and means that is arranged to apply an electric signal to control rotation of the shaft by the motor, the controlling signal being derived, in dependence upon the settings of said second switch means, selectively from one or both of two signals that are induced in the two windings respectively of the second pair of resolver windings, the arrangement being such that the motor rotates the shaft so as to tend to reduce to zero the amplitude of the controlling signal and thereby angularly position the shaft in dependence upon the settings of the first and second switch means.

The first and second switch means may comprise electronic or mechanical switches.

Electrical apparatus according to the present invention for angularly positioning a shaft within one revolution in dependence upon eight input digital signals, will now be described, by way of example, with reference to the accompanying drawings, in which:

FIGURE 1 is a circuit diagram, partly in block schematic form, of the apparatus;

FIGURE 2 illustrates the relationship between two signals that are representative of a demanded position of the shaft within a sector of its revolution;

FIGURES 3 and 4 show the constructions of respective switch units of the apparatus.

Figure 5:
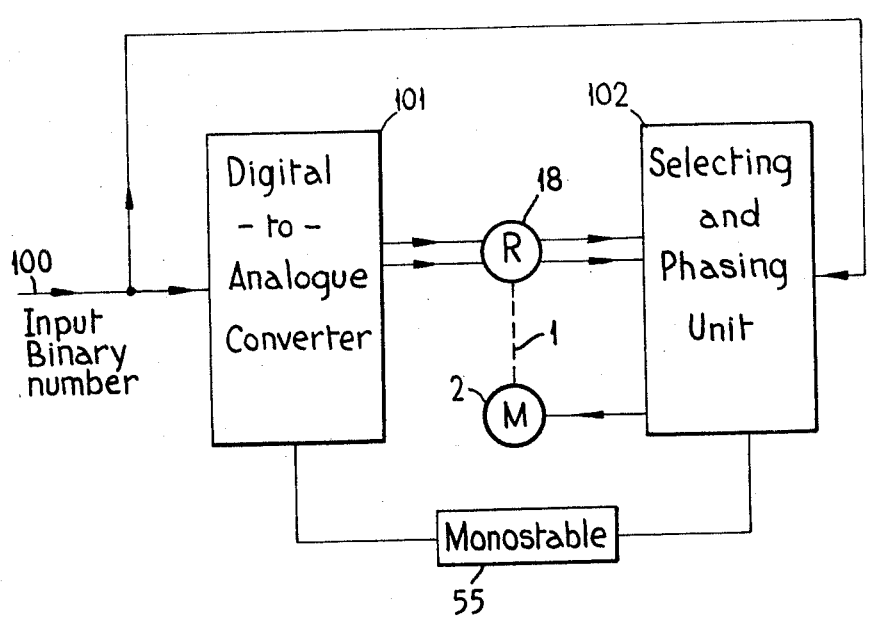
FIGURE 5 is a generalized block schematic diagram of the apparatus.

Referring to FIGURE 5, a shaft 1 is angularly positioned by an electric servo motor 2 in accordance with eight input electric signals that are applied to an input path 100 of the apparatus. The input signals are representative of the values, each "0" or "1," of respective digits of an eight digit binary number, each of the two hundred and fifty-six possible values of the eight digit number being demanding of a respective one of two hundred and fifty-six substantially equally-spaced angular positions of the shaft 1 within one revolution.

The five least significant digits represented by the input signals on the path 100 are conveyed to a digital-to-analogue converter 101. The converter 101 supplies to a resolver 18 two electric signals that are together representative of one or other of thirty-two angular positions of the shaft 1 within a sector of 45 degrees, the particular shaft position represented being dependent upon the values of the five least significant digits. The two electric signals are in fact representative respectively of mutually perpendicular components of a vector that defines within the sector the shaft position demanded by the five least significant digits.

The resolver 18 has a rotor that is coupled to the shaft 1 and supplies to a selecting and phasing unit 102 two electric signals that are representative respectively of the components of the demanded shaft position vector along mutually perpendicular axes defined in the resolver rotor. The unit 102 derives an electric signal for control of the motor 2 from the latter two signals. The values of the three most significant digits represented by the signals on the input path 100 are conveyed to the unit 102 and determine in which of eight ways the control signal is derived from the two signals supplied by the resolver 18. The resultant effect is that the demanded shaft position vector, as represented by the signals from the resolver 18, is rotated in the unit 102 through an angle of 0, 45, 90, 135, 180, 225, 270 or 315 degrees in dependence upon which of the eight possible combinations of values is given by the three most significant input digits. The control signal applied to the motor 2 from the unit 102 is in fact representative of the error of the actual angular position of the shaft 1 from the position demanded by the eight input signals on the input path 100, and causes the motor 2 to rotate the shaft 1 so as to tend to reduce this error to zero. The shaft 1 is accordingly positioned in accordance with the eight-digit input binary member.

In order to ensure that the apparatus always responds to change in the most significant digit of the input binary number, provision is made for the injection of a disturbance into the servo loop through the agency of a monostable circuit 55. Each time the most significant digit changes the monostable circuit 55 causes a transitory change in amplitude of one of the signals supplied to the resolver 18 by the converter 101. There is as a result a corresponding transitory change in the control signal supplied to the motor 2 and this insures, as explained later, the necessary response of the apparatus to change in the most significant digit.

Referring now to FIGURE 1, the input signals that are representative of the values of the first to eighth digits (in descending order of significance) of the input binary number are applied to pairs of input terminals 3 to 10 respectively.

The pair of input terminals 3 is connected to an electronic switch 11 that adopts one or the other of two settings in dependence upon the value of the first input digit. The pairs of input terminals 4 and 5 are connected to a switch unit 12 that adopts one or other of four settings in dependence upon the combination of values of the second and third input digits. The switch units 11 and 12 control, in accordance with their settings, the amplitude and phasing of an error signal that is applied within a servo loop to drive the motor 2. The pairs of input terminals 6 to 10 are connected to electronic switch units 13 to 17 respectively, each of which adopts one or the other of two settings in accordance with the value of the relevant one of the fourth to eighth input digits. The units 13 to 17 control in accordance with their settings, the excitation of the resolver 18 in the servo loop.

The resolver 18 has a stator that carries a pair of windings 19 and 20, and a rotor that is coupled to the shaft 1 and carries a pair of windings 21 and 22. The two windings of each pair have the same number of turns as one another and are wound to have magnetic axes that are mutually perpendicular. The stator winding 19 is excited by alternating current supplied by five transformers 23 to 27 that are associated with the five switch units 13 to 17 respectively. The stator winding 20 on the other hand is excited by alternating current that is supplied by a single transformer 28.

Each transformer 23 to 28 has a primary winding 29 and a secondary winding 30. The primary windings 29 of the transformers 23 to 27 are centre-tapped, and the centre-tappings of these windings are connected in common to a terminal 31 to receive alternating current that is supplied between the terminal 31 and a terminal 32. The terminal 32 is connected directly to the negative pole of a ten volt direct current supply source (not shown) the positive pole of which is connected directly to earth.

The primary windings 29 of the transformers 23 to 27 are connected, all in the same sense, across respective pairs of terminals 33 and 34 of the associated switch units 13 to 17. Each switch unit 13 to 17 provides a low impedance return path to the negative pole of the ten volt supply-source from one or the other of its two terminals 33 and 34 in dependence upon the value of the input digit to that switch unit, the return path extending within the switch unit from the terminal 33 when the relevant value is "0," and from the terminal 34 when the value is "1." Alternating current from the terminal 31 therefore flows through one or the other half of the winding 29 of each transformer 23 to 27, in dependence upon whether the value of the relevant input digit is "0" or "1," so that the phasing of the resultant signal induced in the associated winding 30 is dependent upon this value.

The secondary windings 30 of the transformers 23 to 27 are connected in series with one another to the stator winding 19 of the resolver 18. The excitation signal applied to the winding 19, as a result, has an amplitude that is the algebraic sum of the voltages induced in the windings 30 of the transformers 23 to 27.

The primary winding 29 of the transformer 28 is connected across the two terminals 31 and 32 to receive the input alternating current. The secondary winding 30 of the transformer 28 is connected directly to the stator winding 20 so as to supply to the winding 20 an alternating current excitation signal of constant amplitude.

The signals that are induced in the rotor windings 21 and 22 in consequence of the excitation of the stator windings 19 and 20 are amplified by individual amplifiers 35 and are then applied to primary windings 36 of two transformers 37 and 38 respectively. The transformers 37 and 38, which are associated with the switch unit 12, each have three secondary windings 39, 40 and 41. The windings 39 of the transformers 37 and 38 are connected between terminals 42 and 43 respectively of the unit 12 and a centre-tapping of a primary winding 44 of a further transformer 45. The two secondary windings 40 are connected in series with one another, in the same sense, between a terminal 46 of the unit 12 and the centre-tapping of the winding 44, whereas the two secondary windings 41 are connected in series with one another, in opposite senses, between a terminal 47 of the unit 12 and the centre-tapping of the winding 44.

The switch unit 12 functions to provide a low impedance path to the negative pole of the ten volt supply source from one or other of its four terminals 42, 46, 43 and 47 in dependence upon the combination of values of the second and third input digits which are applied to the pairs of terminals 4 and 5. This low impedance path extends within the unit 12 from the terminals 42, 46, 43 and 47 when the combinations of values of the second and third input digits are "00," "01," "10," and "11" respectively (the two values in each combination being arranged here, and hereinafter, in descending order of significance reading from left to right).

The transformer 45 is associated with the switch unit 11, and its primary winding 44 is connected across two terminals 48 and 49 of the unit 11. The switch unit 11 provides a low impedance path to the negative pole of the ten volt supply source from one or other of the terminals 48 and 49 in dependence upon the value of the first input digit which is applied to the terminals 3 of the unit 11. This low impedance path extends within the unit 11 from the terminal 48 when the value of the first input digit is "0" and from the terminal 49 when the value is "1." Thus in both cases there is a return path through the primary winding 44 and the unit 11 to the negative pole of the ten volt supply source for alternating current induced in the windings 39 to 41 of the transformers 37 and 38. The particular one or ones of the windings 39 to 41 in which this alternating current is induced is dependent upon from which of the terminals 42, 46, 43 and 47 the unit 12 provides the low impedance path to the negative pole of the ten volt supply source, that is, upon the particular combination of values of the second and third input digits. The induced current flows through one or the other of the two halves of the winding 44 of the transformer 45 in dependence upon whether the value of the first input digit is "0" or "1."

A signal that is induced in a secondary winding 50 of the transformer 45 is applied, as the error signal of the servo loop, to a servo amplifier 51. The servo amplifier 51 applies the alternating current error signal to two stator windings 52 of the motor 2 in such manner as to drive the motor 2 and tend thereby to reduce to zero the amplitude of the error signal. Alternating current is supplied to a rotor winding 53 of the motor 2 from a pair of terminals 54, this current being derived from the same source as the alternating current supplied between the terminals 31 and 32. The frequency of the alternating current is four hundred cycles per second.

The motor 2 angularly positions the shaft 1 in one or the other of two half revolutions in dependence upon whether the error signal that is applied to the servo amplifier 51 has one or the other of two opposite phasings. The phase of the error signal is primarily dependent upon whether the first input digit is "0" or "1" since this determines within which of the two halves of the winding 44 altrenating current flows. Thus any change in value of the first input digit effects a one hundred and eighty degree change in phase of the error signal, and is representative of a corresponding angular change in demanded shaft position. The response of the servo motor 2 which is required to produce this change in shaft position is ensured by injecting into the servo loop a small disturbance additional to the change in phase of the error signal. The disturbance is obtained, as referred to above, through the agency of the monostable circuit 55, said circuit 55 being responsive to a positive-going pulse that appears at one or the other of two terminals 56 and 57 of the switch unit 11 when there is any change in value of the first input digit. The monostable circuit 55 is connected to a terminal 58 of the switch unit 13 and in response to the positive-going pulse from the unit 11 supplies a positive-going pulse of ten milliseconds duration to the terminal 58. The effect of the pulse applied to the terminal 58 is to inhibit for its duration the supply of alternating current to the primary winding 29 of the transformer 23. This in its turn produces a transitory change in amplitude of the error signal that ensures the required response of the servo motor 2 in positioning the shaft 1 in the half revolution appropriate to the value of the first input digit.

The angular position to which the shaft 1 is driven within the relevant half revolution is in one or the other of the two quadrants of this half revolution in dependence upon the value of the second input digit, and, within this quadrant, is in one or the other of the two sectors of forty-five degrees in dependence upon the value of the third input digit. The final angular position of the shaft 1 within the relevant sector of forty-five degrees is dependent upon the values of the five least-significant digits, that is, upon the values of the fourth to eighth input digits.

The values of the fourth to eighth input digits determine the phasings of the signals that are induced in the secondary windings 30 of the transformers 23 to 27. Each induced signal is either in-phase or in anti-phase with the input alternating current applied between the terminals 31 and 32, in dependence upon whether this input alternating current flows in one or the other half of the relevant primary winding 29. This in its turn is dependent upon whether the input digit to the associated one of the switch units 13 to 17 is "0" or "1."

The turns ratios of the transformers 23 to 27 are different, these ratios being such that the signals induced in the windings 30 of the transformers 23 to 27 have amplitudes that are respectively in the ratios:

$$16:8:4:2:1$$

The amplitudes of the signals that are induced in the windings 30 of the transformers 23 to 27 are therefore in the same ratios to one another as the significances of the corresponding input digits. The excitation signal that is applied to the stator winding 19 of the resolver 18 is consequently in-phase or in anti-phase with the input alternating current in dependence upon whether the value of the fourth input digit is "0" or "1." The amplitude of the excitation signal has one of sixteen different values in accordance with the values of the fifth to eighth input digits. Thus the winding 19 is excited in one or other of thirty-two different ways in dependence upon the combination of values of the five least-significant input digits.

As regards the resolver 18 the excitation signal applied to the stator winding 19 acts as though representative of the sine within a forty-five degree sector of the particular shaft angle that is being demanded by the five least-significant digits. The constant amplitude excitation signal applied to the stator winding 20 on the other hand acts as though representative of the cosine of the demanded shaft angle within the relevant sector. The relationship between the two excitation signals and the forty-five degree sector is illustrated in FIGURE 2.

Referring to FIGURE 2, the excitation signals applied to the windings 19 and 20 are represented by mutually perpendicular vectors DP and CD respectively within a forty-five degree sector ABC. The vector DP is directed in one or the other sense along the chord AB in dependence upon whether the excitation signal is in-phase or in anti-phase with the alternating current from which it is derived, that is, upon whether the value of the fourth input digit is "0" or "1." The lengths DP and CD are representative of the amplitudes of the excitation signals applied to the stator windings 19 and 20 respectively. There are thirty-two equally-spaced positions of the point P along the chord AB, these positions corresponding respectively to the thirty-two possible combinations of the values of the five least-significant input digits. The positions corresponding to th ecombinations of values throughout the sequence from "00000" to "11111" follow one after the other in the same sequence along the length of the chord AB. (In FIGURE 2 the five values in each indicated combination are arranged in descending order of significance reading from left to right.)

The demanded shaft position within the sector ABC is represented by the vector CP, and there are therefore thirty-two possible shaft positions within the sector corresponding respectively to the thirty-two equally-spaced positions of the point P along the chord AB. Thus the thirty-two combinations of values of the five least-significant input digits are actually demanding of respective shaft positions that are not equally-spaced from one another angularly. The angle DCP is in all cases less than 22.5 degrees so the amounts by which these shaft positions differ from positions that are equally-spaced angularly, are in general negligible.

The signals that are induced in the rotor windings 21 and 22 (FIGURE 1) have amplitudes that are respresentative of the demanded shaft position vector CP as resolved along the two mutually perpendicular axes defined in the rotor by the magnetic axes of the windings 21 and 22 (FIGURE 1) have amplitudes that are representative in the rotor windings 21 and 22 have amplitudes that are respectively representative of the two functions:

$$(DP) \cos \theta - (CD) \sin \theta$$
$$(CD) \cos \theta + (DP) \sin \theta$$

where $\theta$ is the angular displacement of the shaft 1 from the datum position in which the magnetic axes of the two rotor windings 21 and 22, are aligned in the same senses, with the magnetic axes of the two stator windings 19 and 20 respectively (as shown in FIGURE 1).

Referring again to FIGURE 1, the two transformers 37 and 38, to which the signals induced in the rotor windings 21 and 22 are applied, provide a further resolution of the demanded shaft position vector. The resolution is selectively of zero, forty-five, ninety, or one hundred and thirty-five degrees, depending upon whether the combination of values of the second and third input digits is "00," "01," "10" or "11" respectively. To this end the numbers of turns in the secondary windings 39, 40 and 41 of each transformer 37 and 38, are in the ratios:

$$1:0.7:0.7$$

Assuming that the amplitudes of the signals applied to the primary windings 36 of the transformers 37 and 38 are X and Y respectively, the amplitudes of the signals that are applied to the centre-tapping of the winding 44 when the combinations of values of the second and third digits are "00," "0.1," "10" and "11," are respectively representative of:

$$X$$
$$0.7X + 0.7Y$$
$$Y$$
$$-0.7X + 0.7Y$$

that is, respectively representative approximately of:

$$X \cos 0° + Y \sin 0°$$
$$Y \cos 45° + Y \sin 45°$$
$$X \cos 90° + Y \sin 90°$$
$$X \cos 135° + Y \sin 135°$$

The effects of these four resolutions are to rotate the shaft position vector as demanded by the five least-significant input digits through angles of zero, forty-five, ninety, and one hundred and thirty-five degrees respectively. The particular one of four sections of forty-five degrees within which the demanded shaft position lies is thereby decided by the combination of values of the second and third digits.

The amplitude and phase of the signal applied from the transformers 37 and 38 to the winding 44 is representative within one half-revolution of the "error" in magnitude and sense, of the actual angular position of the shaft 1 from the position demanded by the values of the second to eighth input digits. As explained above the value of the first input digit decides the phase in which this signal is applied, as the error signal, to drive the motor 2. The sense in which the motor 2 rotates the shaft 1 to reduce the amplitude of the error signal to zero is depednent upon the phasing of the error signal in relation to the signal applied between the terminals 54. Accordingly the shaft 1 is positioned in one or other of two half revolutions in dependence upon the value of the first input digit.

The amplitude of the error signal is substantially zero when the shaft 1 has settled in the demanded position. Any change in the shaft position demanded results in a corresponding change in amplitude of the error signal so that the motor 2 rotates the shaft 1 to the newly demanded position. This implies even in the circumstances in which there is a one hundred and eighty degree change in the demanded position as represented by a change in value of the first input digit alone. A change in value of the first input digit produces a change in phase of the error signal, and since the error signal is of substantially zero amplitude, this phase change alone is not relied upon to produce the required response of the motor 2. However, as referred to above, a transitory change in amplitude of the error signal is brought about each time there is a change in value of the first input digit, by the application of a positive-going pulse from the monostable circuit 55 to the terminal 58 of the switch unit 13. The operation of the switch unit 13 is inhibited by the pulse applied to the terminal 58 so that during the pulse there is no return path to the negative pole of the ten volt supply source from either of its terminals 33 and 34. The transformer 23 therefore makes no contribution towards the excitation of the winding 19 during the pulse applied to the terminal 58. As a consequence there is an apparent transistory change of approximately 0.7 degree in the demanded shaft position, and the resulting transitory change in the error signal ensures the required response of the motor 2.

The eight digit input number is representative of demanded angular position of the shaft 1 in accordance with a binary code in which zero corresponds to a "zero" position of the shaft 1. In view of the resolution provided by the resolver 18 this "zero" position of the shaft 1 is that in which:

$$\theta = -22.5 \text{ degrees}$$

$\theta$, as defined hereinbefore, being measured from the datum position of the rotor of the resolver 18.

The construction of the electronic switch units 11 to 17 will now be described with reference to FIGURES 3 and 4. FIGURE 3 shows the construction of the switch unit 13.

Referring to FIGURE 3, the input terminals 6 of the unit 11 are connected to a bistable circuit 60 that adopts one or the other of its two stable states, "0" and "1," in accordance with the value of the input digit. The bistable circuit 60 has two output leads 61 and 62 that are connected to input terminals 63 and 64 respectively of a gate circuit 65.

The terminals 63 and 64 are connected, within the gate circuit 65, through individual rectifiers 66 to the base electrodes 67 of two P-N-P symmetrical junction transistors 68 and 69 respectively. The base electrodes 67 are connected through respective resistors 70 to the negative pole of a twenty volt supply source (not shown) the positive pole of which is connected directly to earth.

Each transistor 68 and 69 has in addition to its base electrode 67 two electrodes 71 either of which may function as an emitter or collector electrode. One electrode 71 of the transistor 68 is connected to the terminal 33, and one electrode 71 of the transistor 69 is connected to the terminal 34. The other electrodes 71 of the two transistors 68 and 69 are connected in common to the negative pole of the ten volt supply source.

The terminal 58, which is normally maintained by the monostable circuit 55 (FIGURE 1) at twenty volts negative with respect to earth, is connected through two rectifiers 72 to the base electrodes 67 of the respective transistors 68 and 69.

The potential of each lead 61 and 62 of the bistable circuit 60 is either that of earth or some fourteen volts negative with respect to earth in dependence upon whether the bistable circuit 60 is in the state "0" or "1." When the bistable circuit 60 is in the state "0" the lead 62 is at earth potential and the lead 61 is at a potential that is fourteen volts negative with respect to earth. In these circumstances the transistor 69 is non-conductive, whereas the transistor 68 is conductive to provide a low impedance path, in either direction, between the terminal 33 and the negative pole of the ten volt supply source. When on the other hand the bistable circuit 60 is in the state "1," the potential of the lead 62 is fourteen volts negative with respect to earth and the lead 61 is at earth potential. In these circumstances the transistor 68 is non-conductive, whereas the transistor 69 is conductive to provide a low impedance path, in either direction, between the terminal 34 and the negative pole of the ten volt supply source.

The positive-going pulse that is applied to the terminal 58 from the monostable circuit 55 (FIGURE 1) upon the change in value of the first input digit, causes whichever of the transistors 68 and 69 that is then conductive to become non-conductive for the duration of that pulse. Thus during the pulse neither of the transistors 68 and 69 is conductive so that there is then no low impedance path to the negative pole of the ten volt supply source from either of the terminals 33 and 34.

The switch units 11, and 14 to 17 are of the same construction as the switch unit 13 shown in FIGURE 3, except that in each case there is no terminal corresponding to the terminal 58 and consequently no rectifiers corresponding to the rectifiers 72. In the case of the switch unit 11 the construction shown in FIGURE 3 is further modified by the addition of two capacitors 73, that are connected (as shown in dashed lines in FIGURE 3) between the two output leads (61 and 62) of the bistable circuit (60) and the two terminals 57 and 56 respectively of the unit 11. A positive-going pulse is applied to one or other of the terminals 56 and 57 through the associated capacitor 73 each time there is a change in stable state of the bistable circuit (60).

The construction of the switch unit 12 is shown in FIGURE 4, and will now be described.

Referring to FIGURE 4, the two pairs of input terminals 4 and 5 of the unit 12 are connected to two bistable circuits 74 and 75 respectively. Each bistable circuit 74 and 75 adopts one or the other of its two stable states, "0" and "1," in accordance with the value of the respective input digit. The bistable circuits 74 and 75 have pairs of output leads 76 and 77, the leads 76 and 77 of each pair being respectively at fourteen volts negative with respect to earth and earth potential when the state of the relevant bistable circuit 76 or 77 is "0," and at earth potential and fourteen volts negative with respect to earth when the state is "1."

The leads 76 and 77 of the bistable circuit 74 are connected to terminals 78 of two gate circuits 79 and 80 respectively. The leads 76 and 77 of the bistable circuit 75 on the other hand are connected to two terminals 83 and 84 respectively of each gate circuit 79 and 80. Each gate circuit 79 and 80 has the same construction as the gate circuit 65 of FIGURE 3, the terminals 78, 83 and 84 corresponding to the terminals 58, 63 and 64 respectively of the gate circuit 65. The terminals 42 and 46 of the unit 12 are terminals of the gate circuit 80 that correspond to the terminals 33 and 34 respectively of the gate circuit 65, and the terminals 43 and 46 are corresponding terminals of the gate circuit 79.

Only one of the gate circuits 79 and 80 is operative at any one time. The particular one of the gate circuits 79 and 80 that is operative is dependent upon whether the bistable circuit 74 is in the state "0" or "1." When the bistable circuit 74 is in the state "0" the gate circuit 80 is operative, the operation of the gate circuit 79 at this time being inhibited by the earth potential that then appears on the lead 77 of the bistable circuit 74. In these circumstances the unit 12 provides a low impedance path to the negative pole of the ten volt supply source from the terminal 42 when the bistable circuit 75 is in the state "0," and from the terminal 46 when the bistable circuit 75 is in the state "1." When, on the other hand, the bistable circuit 74 is in the state "1" the gate circuit 79 is operative, and the gate circuit 80 is inhibited by the earth potential that then appears on the lead 76 of the bistable circuit 74. In these circumstances the unit 12 provides a low impedance path to the negative pole of the ten volt supply source from the terminal 43 when the bistable circuit 75 is in the state "0" and from the terminal 47 when the bistable circuit 75 is in the state "1."

We claim:

1. Electrical apparatus for angularly positioning a shaft in dependence upon input digital signals, comprising an electric motor for rotating to shaft, means for supplying two signals that are together representative of a shaft position vector as demanded by the digital values of a first group of said input signals, an electric resolver which has a rotor coupled to the shaft to rotate therewith, and which is responsive to said two signals to supply two electric signals the amplitudes of which are representative of the components of said vector along respective axes defined in the rotor, and means for supplying to the motor for controlling rotation of the shaft by the motor an electric signal that is dependent in amplitude selectively upon one or both of the signals supplied by the resolver in dependence upon the digital values of a second group of said input signals, the arrangement being such that the amplitude of the controlling signal is dependent on the one band upon the angular position of the shaft and on the other hand upon the digital values of the input signals, and the motor rotates the shaft so as to tend to reduce the amplitude of the controlling signal to zero and thereby angularly position the shaft in accordance with the digital values.

2. Electrical apparatus according to claim 1 including means that is arranged to effect rotation of the demanded shaft position vector selectively through one or other of a plurality of predetermined angles in dependence upon the signal values of said second group of input signals.

3. Electrical apparatus according to claim 1 wherein one of said two signals applied to the resolver is of substantially constant amplitude.

4. Electrical apparatus according to claim 1 wherein the controlling signal is an alternating current signal, and it is arranged that the phasing of the controlling signal is dependent upon the value of the most-significant digit represented by the input signals, the arrangement being such that the particular one of a plurality of sectors of shaft rotation within which the shaft is positioned by the motor is dependent upon the phasing of the controlling signal.

5. Electrical apparatus for angularly positioning a shaft in dependence upon input digital signals, comprising an electric motor for rotating the shaft, an electric resolver having a rotor and a stator that carry two pairs of windings respectively, the rotor being coupled to the shaft so as to rotate therewith relative to the stator, a plurality of first switch means that are arranged to be set in dependence upon the values of lesser-significant digits represented by the input digital signals, means for applying alternating current excitation signals to a first of the two pairs of resolver windings, it being arranged that the amplitude of the excitation signal that is applied to one of the two windings of the first pair is dependent upon the settings of said first switch means, a plurality of second switch means that are arranged to be set in dependence upon the values of more-significant digits represented by the input digital signals, and means that is arranged to apply to the motor an electric signal to control rotation of the shaft by the motor, the controlling signal being derived, in dependence upon the settings of said second switch means, selectively from one or both of two signals that are induced in the two windings respectively of the second pair of resolver windings, the arrangement being such that the motor rotates the shaft so as to tend to reduce to zero the amplitude of the controlling signal and hereby angularly position the shaft in dependence upon the settings of the first and second switch means.

6. Electrical apparatus according to claim 5 wherein the means for applying excitation signals to said first pair of resolver windings includes a plurality of transformers, each first switch means in arranged to control in accordance with its setting the phasing with which alternating current is induced in a secondary winding of a respective one of the transformers, the currents induced in the secondary windings of the different transformers having amplitudes that are in the same ratios to one another as the significances of the respective lesser-significant digits, and the secondary windings are connected in series with one another to the said one winding of the first pair of resolver windings so as to apply an alternating current signal to excite said one windings in accordance with the values of the lesser-significant digits.

7. Electrical apparatus according to claim 5 wherein it is arranged that the particular one of a plurality of equal sectors of shaft revolution within which the shaft is positioned by the motor is dependent upon the settings of the second switch means.

8. Electrical apparatus according to claim 5 wherein the controlling signal is an alternating current signal, and it is arranged that the controlling signal is selectively in-phase or in anti-phase with a reference signal in dependence upon the value of the most-significant digit represented by the input signals, the arrangement being such that the particular one of two half revolutions within which the shaft is positioned by the motor is dependent upon whether the controlling signal is in-phase or in anti-phase with the reference signal.

9. Electrical apparatus for angularly positioning a shaft in dependence upon input digital signals, comprising an electric motor for rotating the shaft, means for supplying two electric signals that are together representative of a shaft position vector as demanded by the digital values of a first group of said input signals, an electric resolver which has a rotor coupled to the shaft to rotate therewith and which is responsive to said two signals to supply two electric signals the amplitudes of which are representative respectively of components of said vector along mutually perpendicular axes defined in the rotor, and further means for deriving from said signals supplied by the resolver an electric signal that is dependent at least in amplitude upon the digital values of a second group of said input signals such that the amplitude of the signal so derived is dependent on the one hand upon the angular position of the shaft and on the other hand upon the digital values of the first and second groups of input signals, the arrangement being such that the signal derived by said further means is applied to the motor for controlling the rotation by the motor of said shaft, and that the motor rotates the shaft so as to tend to reduce the amplitude of the controlling signal to zero and thereby angularly position the shaft in accordance with the digital values of the input signals.

10. Electrical apparatus according to claim 9 wherein the further means includes two transformers each having a primary winding and a plurality of secondary windings, the two signals supplied by the resolver being applied to the primary windings of the two transformers respectively, and switch means for adopting a setting dependent upon digital values represented by signals of the second group of input signals, said switch means being connected to the secondary windings of the two transformers to supply an electric signal which is derived from different ones of the secondary windings of the two transformers for different settings of the switch means.

11. Electrical apparatus for angularly positioning a shaft in dependence upon input digital signals, comprising: an electric motor for rotating the shaft; an electric resolver having a stator, a rotor which is coupled to the shaft so as to rotate therewith relative to the stator, and two pairs of electrical windings, one pair of windings being carried by the stator and the other pair being carried by the rotor; first means for applying alternating current excitation signals to a first of the two pairs of resolver windings, said first means including a plurality of first switches that are arranged to be set in dependence upon the values of a first plurality of the digits represented by the input digital signals so that the amplitude of the excitation signal that is applied to one of the two windings of the first pair is dependent upon the settings of said first switches; first and second transformers each having a primary winding and a plurality of secondary windings; second means for applying signals induced in the second pair of resolver windings to the primary windings of said first and second transformers respectively; a third transformer having a primary winding and a secondary winding; third means for deriving an electric signal from signals induced in the secondary windings of the first and second transformers, said third means including a plurality of second switches arranged to be set in dependence upon the values of a second plurality of the digits represented by the input digital signals to select different ones of the signals induced in the secondary windings of the first and second transformers for different settings of said second switches; a third switch for applying the signal derived by said third means to the primary winding of the third transformer selectively with one or the other of two opposite phasings in dependence upon the value of the most-significant digit represented by said input signals; and means for supplying a signal induced in the secondary winding of the third transformer to the motor so as to control rotation of the shaft by the motor, the arrangement being such that the motor rotates the shaft so as to tend to reduce to zero the amplitude of the controlling signal and thereby angularly position the shaft in dependence upon the settings of the first, second and third switches.

References Cited in the file of this patent

UNITED STATES PATENTS

| | | |
|---|---|---|
| 2,537,427 | Seid et al. | Jan. 9, 1951 |
| 2,715,703 | Schuck | Aug. 16, 1955 |
| 2,775,727 | Kernabon et al. | Dec. 28, 1956 |
| 2,792,545 | Kamm | May 14, 1957 |
| 2,885,613 | Myracle et al. | May 5, 1959 |
| 2,874,343 | Steele | Feb. 17, 1959 |